United States Patent [19]

Morgan

[11] Patent Number: 4,785,576

[45] Date of Patent: Nov. 22, 1988

[54] PLANT SUPPORT AND PROTECTOR

[76] Inventor: Manfred Morgan, 1500 Clovernoll Dr., Cincinnati, Ohio 45231

[21] Appl. No.: 817,918

[22] Filed: Jan. 13, 1986

[51] Int. Cl.[4] ............................................. A01B 17/06
[52] U.S. Cl. ..................................... 47/28 R; 47/45; 52/146; 135/118
[58] Field of Search .................. 47/44, 45, 46, 47, 28; 135/118; 52/155, 162, 163, 164, 146

[56] References Cited

U.S. PATENT DOCUMENTS

| | | |
|---|---|---|
| 374,906 | 12/1887 | Rovane . |
| 546,167 | 9/1895 | Leonard . |
| 641,859 | 1/1900 | Henry ..................................... 47/45 |
| 760,879 | 5/1904 | Kunzman . |
| 764,472 | 7/1904 | Kessler . |
| 1,129,838 | 3/1915 | Allen ....................................... 47/47 |
| 1,324,237 | 12/1919 | Eue . |
| 1,361,464 | 12/1920 | Hunt ....................................... 47/47 |
| 1,560,404 | 11/1925 | Brown . |
| 1,898,499 | 2/1933 | Schuett ................................. 52/146 |
| 2,009,867 | 7/1935 | Ball ......................................... 47/44 |
| 2,152,018 | 3/1939 | Barnhart ................................ 47/44 |
| 2,196,544 | 4/1940 | Bagley ................................. 135/118 |
| 2,677,384 | 5/1954 | Luisada ............................... 135/118 |
| 2,784,779 | 3/1957 | Knipfer et al. ...................... 135/159 |
| 2,889,838 | 6/1959 | Aviezer et al. ...................... 135/118 |
| 4,096,662 | 6/1978 | Anderson ............................... 47/47 |
| 4,106,233 | 8/1978 | Horowitz ............................... 47/44 |
| 4,285,163 | 8/1981 | Booker, Jr. ............................. 47/45 |
| 4,429,849 | 2/1984 | Maier ................................... 55/155 |

FOREIGN PATENT DOCUMENTS

| | | | |
|---|---|---|---|
| 94220 | 1/1939 | Sweden ................................ 52/146 |
| 568001 | 10/1975 | Switzerland .......................... 47/46 |
| 1114376 | 9/1984 | U.S.S.R. ................................. 47/45 |
| 458514 | 12/1936 | United Kingdom ................... 47/47 |
| 632614 | 11/1949 | United Kingdom ................. 52/146 |
| 716306 | 9/1954 | United Kingdom ................... 47/45 |
| 958157 | 5/1964 | United Kingdom ................. 52/155 |
| 1452430 | 10/1976 | United Kingdom ................... 47/47 |

Primary Examiner—Richard J. Johnson
Attorney, Agent, or Firm—George P. Brandenburg

[57] ABSTRACT

An improved plant support device includes means for folding and/or disassembly for storage and comprises an anchor angle for added support. The improved plant support can be used in spaced apart multiples with additional supports therebetween. One form includes a translucent cover means to define a hot house type structure.

9 Claims, 3 Drawing Sheets

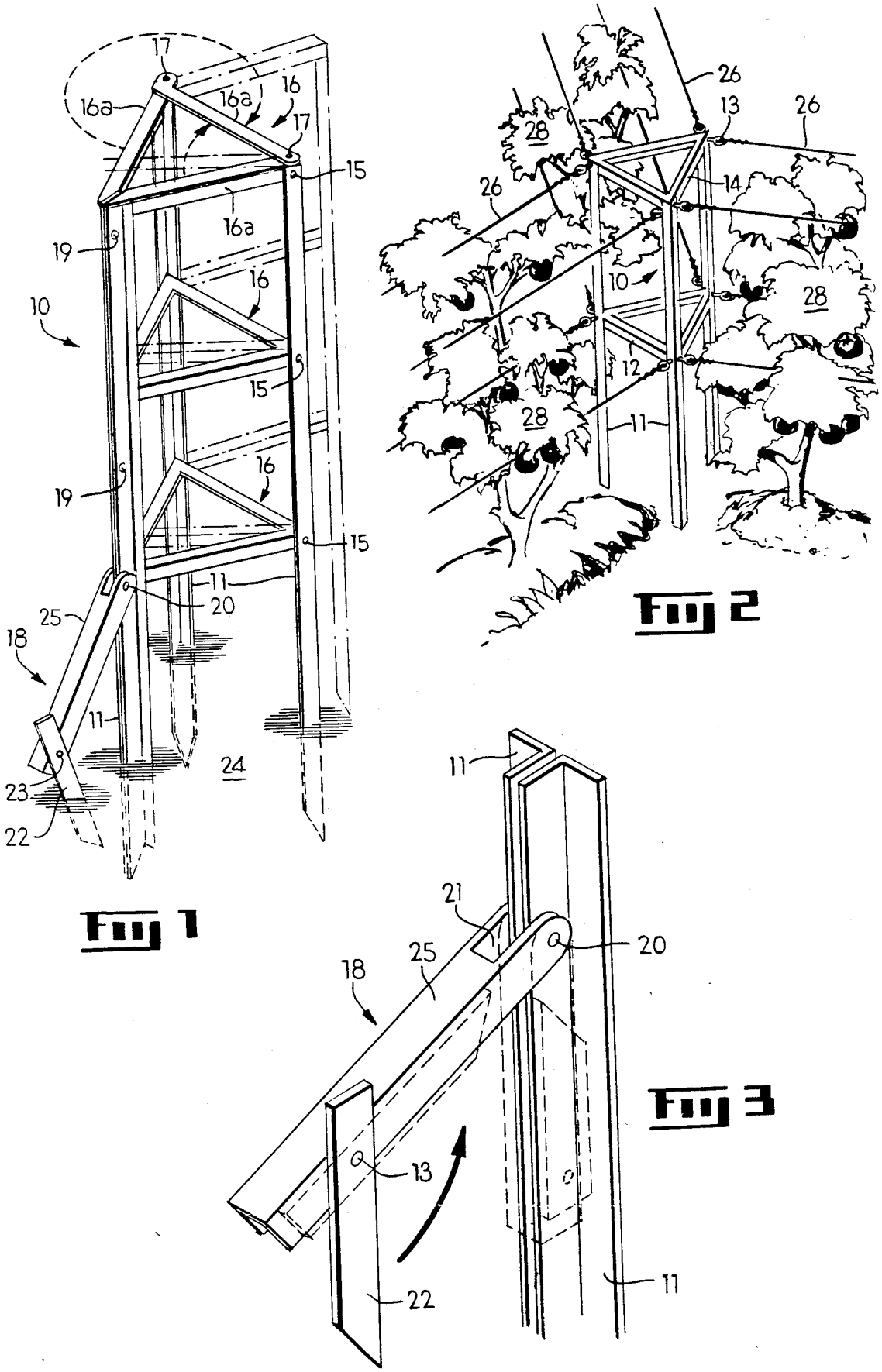

PLANT SUPPORT AND PROTECTOR

BACKGROUND OF THE INVENTION

1. Field of the Invention

This invention relates to plant supports and more particularly to improved ground supports for fruits, vegetables and other plants to support the weight of their shafts and to sustain them during their growing period.

2. Description of the Prior Art

It is well known that various growing fruits and vegetables require support or training in order to produce a satisfactory yield and to protect them during the growing period from strong winds, birds, ground beasts and pests.

The best known and most widely used method of training known in the art is the simple single-stake method. Generally wooden, aluminium, or metal stakes in an approximate size of 2 inches by 2 inches by 8 feet long are driven into the ground approximately 2 to 3 feet apart. As the plants grow, they are sequentially tied or fastened to the stake in order to support the plant during the growing season.

Other methods of training and supporting the fruit plants or vegetable plants during the growing seasons are known in the art. One method is the provision of wire cages. Such wire cages are generally formed in a circular structure and are formed from wire mesh or screening of various sizes.

Other supports known in the art are generally formed from wire or wood and have the general geometrical shape of a square.

A further known support in the prior art consists of a plant support system which is generally triangular in shape which may be foldable for off-season storage.

In the growth of fruit and vegetable plants, tomatoe plants being of primary interest as well as string beans, it is well known that improvements in yields will occur when the fruits or vegetables are subject to vibration during the growing period. The vibration of the plant performs a significant function. Increased polination will occur during the time when the plant's flower clusters are near the top of the plant and vibration enhances polination. Furthermore, an improved training structure will allow the plants to maintain their flower clusters effectively at the top of the plants during the growing and polination period. Additionally, it is well known that as oxygen supply is increased to the roots the plants will grow and flourish more significantly. The capability of the support of the present invention to move in the wind tends to aerate the soil and thus increase oxygen supply to the plant roots.

It is well known that in order to provide the food needs of the world population it is desirable to increase yields of all plants.

The prior art structures, although generally providing a means for supporting the growing fruit during its growing season do not provide for increasing production yields through has consideration of increased polination and oxygenation to the roots nor do they give sufficient consideration to the increased yield per given area of growing space.

SUMMARY OF THE INVENTION

A primary object of the invention is to provide a multifunctional device adaptable to a variety of uses including incubation, growing and the support of growing fruit and vegetable plants.

A second object of the invention is to provide a storable device for such uses that is inexpensive, durable, easily assembled and easily repaired with individual part replacement.

Another object of the invention is to provide such a support that is simple to assemble from cooperating internesting units which can be joined to increase height during the growing season.

Yet another object of the invention is to provide a support system for the growing of fruits and vegetables which can be used in conjunction with additional or other such support systems wherein said support structure includes an anchoring means to be employed at the ends of a row of such vegetable supports.

A further object of the invention is to provide a means for the inexpensive support of additional vegetable plants.

Yet a further object of the invention is to provide a means whereby the support structure can be used as an incubation or hot-house type structure wherein the covering means will allow the introduction of sunlight, while protecting the plants from wind, insects, animals, and the like.

These and other objects, features, and advantages of the invention will be apparent from the following detailed description taken in conjunction with the accompanying drawings showing preferred embodiments of the invention.

The device of the invention in one form is an improved plant support capable of providing a means for folding and/or disassembly for storage and providing an anchor angle for additional support. A more specific embodiment of the invention is generally triangular in shape comprising, in addition to the anchor angle, at least two horizontal members generally triangular in shape, one lying above the other and separated by a distance, and three substantially vertical or leg members attached to each horizontal member such as at their apexes to form a free standing device. The device of the invention is capable of being used with modification thereto or in conjunction with other such devices to define a given plant support system depending on the plants grown and desired density or yield of said products. The device of the present invention is designed for ease of construction, use, storage and repairability.

BRIEF DESCRIPTION OF THE DRAWINGS

For a better understanding of the invention, reference may be had to the following description, taken in conjunction with the accompanying drawings wherein:

FIG. 1 is a perspective view of one embodiment of the invention showing the attachment of an anchoring means.

FIG. 2 is an enlarged pictoral perspective view of an alaternate embodiment of the invention.

FIG. 3 is an enlarged pictoral perspective view of the anchoring means of the embodiment of FIG. 1.

DESCRIPTION OF THE PREFERRED EMBODIMENT

Figure 4:
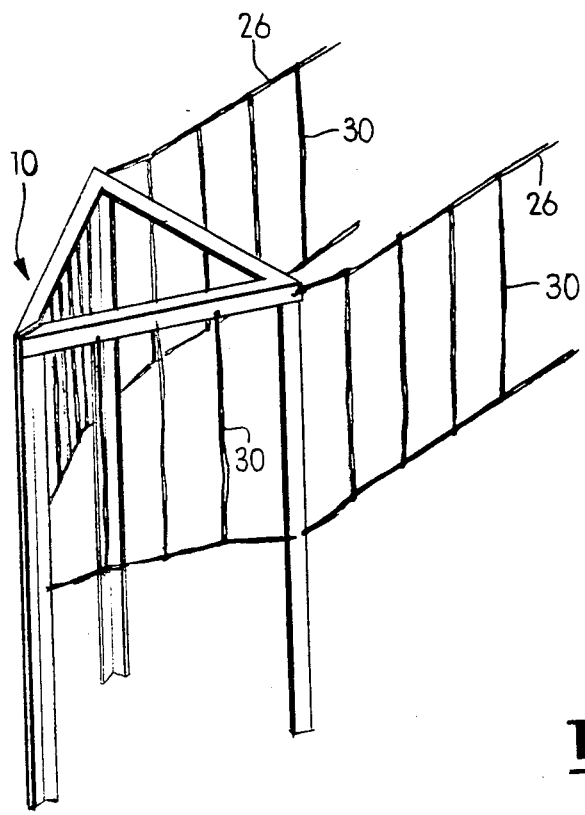
FIG. 4 is a perspective view of an alternate embodiment of the invention.

Referring more particularly to the drawings, wherein like numbers refer to like parts in each view, FIG. 1 illustrates a preferred embodiment of the present invention. The ground plant support of the present invention is shown generally at 10 in FIG. 1. The plant support 10 comprises an assembly of at least two traingular members 16 each defined by edge members 16a to surround an interior space and each lying substantially in horizontal planes one directly above the other and separated by some distance, and three substantially vertical legs 11 extending generally vertically from and connecting the corners of the traingular members. The triangular members 16 are fastened to the vertical legs 11 by a fastening means 15 such as a pin, rivet, weld, etc. depending upon whether relative rotation between the member 16 and leg 11 is desired at that junction. In addition, the plant support 10 shown in FIG. 1 also comprises an adjustable and storable anchor angle 18 which is shown with its second or lower substantially rigid alternate member or ground engaging portion 22 imbedded in the ground shown generally at 24 and its first or upper substantially rigid portion 25 rotatably attached to a vertical leg assembly at 20. It can be appreciated from one skilled in the art that the plant support assembly 10 can be constructed of any satisfactory material such as wood, aluminum, plastic, etc. and the individual members may take any shape such as square, rectangular, circular or triangular.

The plant support assembly 10 in the embodiment shown in FIG. 1 may be disassembled and folded as shown in phantom in FIG. 1 such that when folded the assembly body will be in the form of a rectangular mass having a general ladder shape when viewed from the front when in a standing position. The structure will appear to have three horizontal cross members and attached thereto two substantially vertical members. In this embodiment, fastening means 15 generally are rigid such as welds or rivets, and the support is provided with rotatable fastening means at 17 such as pins. Clamping means 19, such as a nut and bolt arrangement, preferrably are provided to assist the anchor angle 18 in securing the support in its fully assembled position. With the ability to fold the plant support a number of them may be stored efficiently during the nongrowing season and made available for reuse during the next growing season.

The adjustable, storable anchor angle 18 is shown in an enlarged view in FIG. 3 at an acute angle to the vertical leg. In the embodiment shown in FIGS. 1 and 3, the anchor angle is attached to two adjacent legs and assists in securing the support together. However, in other embodiments such as one associated with FIGS. 7 and 8, the anchor angle 18 can be attached to any one of the vertical legs 11 at a lower ground contacting portion by fastening means 20 shown in FIG. 3. The anchor angle 18 has a recessed slot 21 in upper substantially rigid member 25 designed to accept that portion of the vertical leg 11 as required to attach said anchor angle to said vertical leg by rotatable fastening means 20. At the opposite end of said anchor angle 18, in the embodiment of FIG. 1, there is fastened a substantially rigid lower or alternate member 22 attached to anchor angle 18 by fastening means 23. It is to be understood that both fastening means 20 and 23 preferably allow for easy movement of the entire anchor angle 18 as well as the alternate member 22 in a slidable and/or rotatable fashion such that the alternate member 22 may be driven into the ground 24 to secure the plant support 10 when in service. The stored or folded position of the elements of anchor angle 8 are shown in phantom in FIG. 3. It should be noted by one skilled in the art that the anchor angle 18 and its alternate member 22 attached thereto may be made of any suitable material such as wood, aluminium, plastic, etc. and may be of any acceptable shape such as square, rectangular, circular, triangular, etc. to secure the plant support 10 when in service.

It should further be noted that the vertical support members 11 and the alternate member 22 of anchor angle 18 include a pointed end to allow easy placement within the ground 24. If desired for additional strenthening of the support of the present invention than that shown or discussed herein, it will be recognized by those skilled in the art that additional bracing and strengthening members can be added as appropriate and as desired.

The advantage of using the plant support system of the present invention is that its design allows the planting of more plants per unit area than previous methods known in the art. The structure is significantly stronger and more stable to enable support of more than one plant per support unit. It is known in the art that the planting of additional plants within a unit area with adequate nutrients will not reduce the size of the fruit developed, therefore providing a greater yield per unit area.

The plant support unit 10 of the present invention is manufactured such that it is substantially sturdy, but not fully rigid. Such construction allows for some movement freedom especially as the plants continue their growth and their leaves and vines drape over and about the horizontal member 16 and the vertical members 11. As the wind blows and moves the plants, the plant support 10 of the present invention will also move and vibrate in the wind enhancing polination and allowing sufficient aereation of the plant roots which will allow for greater development of the plants.

It is to be understood that the plant support 10 shown generally in FIG. 1 can be used individually or in combination with additional or other plant supports for quantity production wherein the plant supports are placed in a row within a garden or field. In order to increase yield and reduce cost, the plant support system 10 of the present invention can be used in conjunction with other free standing plant support systems 10 as described above. An alternate embodiment of the present invention is shown in FIG. 2 wherein if it is desired to plant numerous plants in a single row and reduce the number of plant support systems used it is possible to connect multiple plant support systems 10 by the use of a plant support attachment member 26 as shown in FIG. 2 to attach and bridge together a plurality of plant supports. Attachment member 26 is connected to the apex points or points of juncture of the horizontal traingles 12 and 14 and vertical member 11 bhy any convenient fastening means such as an eye hook and connected similarly to the next plant support system 10. It is to be understood that the attachment member 26 can be made of any suitable heavy guage wire, rope or string. A plurality of individual plants 28 can then be planted between the plant supports 10 and the attachment member 26 is to be used to support the additional plants 28.

When the alternate embodiment discussed in FIG. 2 is utilized, it is recommended that the anchor angle 18 of FIG. 1 be utilized with plant support systems 10 on all row end plant supports to assist in the prevention of sagging throughout the row as a result of the additional weight of plants 28 bearing upon attachment members 26.

A further embodiment is shown in FIG. 4 wherein the plant support 10 as in FIG. 1 but shown diagramatically in FIG. 4 is utilized in conjunction with the attachment member 26. Additional support members 30, as single strands or in a web-like arrangement, are attached to attachment member 26 in a manner so as to form a cross-knit or weave assembly. This embodiment is particularly useful in the growing of plants such as pole beans wherein a large number of plants can be planted per unit area and supported by the plant support system 10 and the attached support members 30.

Figure 5:
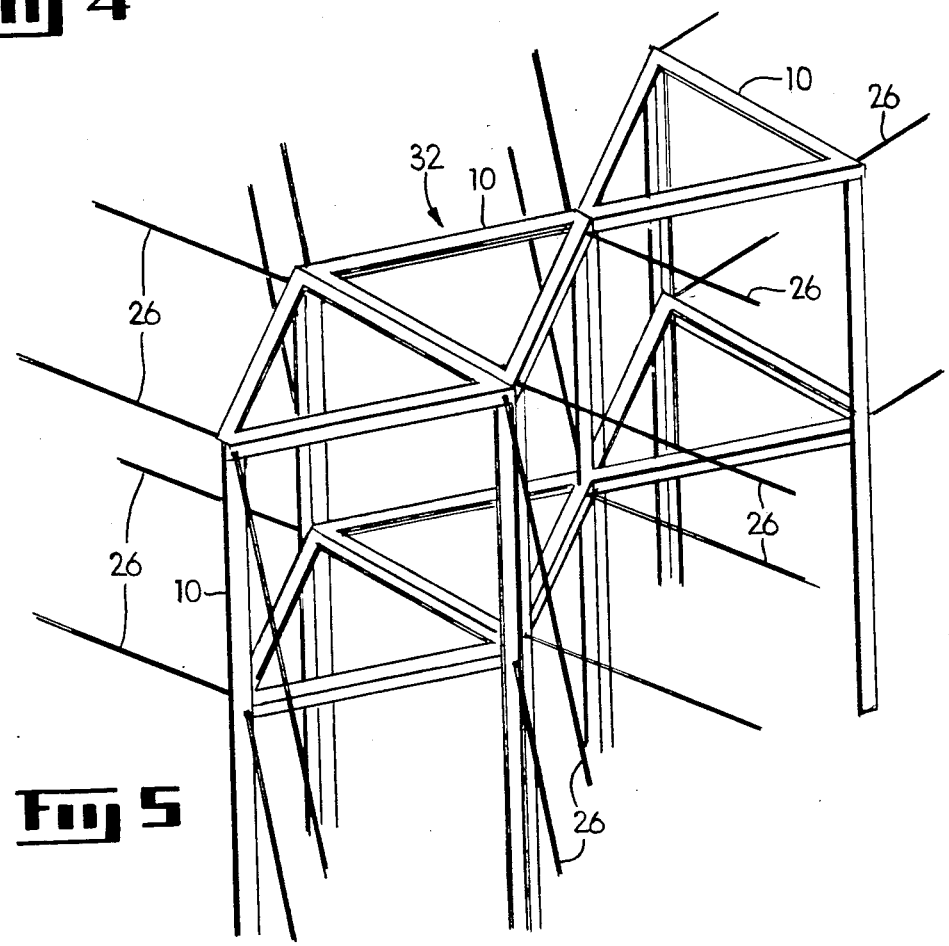
FIG. 5 is a pictoral view of an alternate embodiment of the invention.

An alternate embodiment utilizing attachment members 26 is shown in FIG. 5. Two plant support systems are used conjunctively, shown generally at 32 wherein the two or more general traingular shaped support systems 10, for example, as shown in FIG. 1, are placed adjacent to each other to form a plant support system having a generally square, diamond or rectangular shape. This embodiment will allow for the maintenance of relatively straight and square rows of growing plants within the garden or field.

Figure 6:
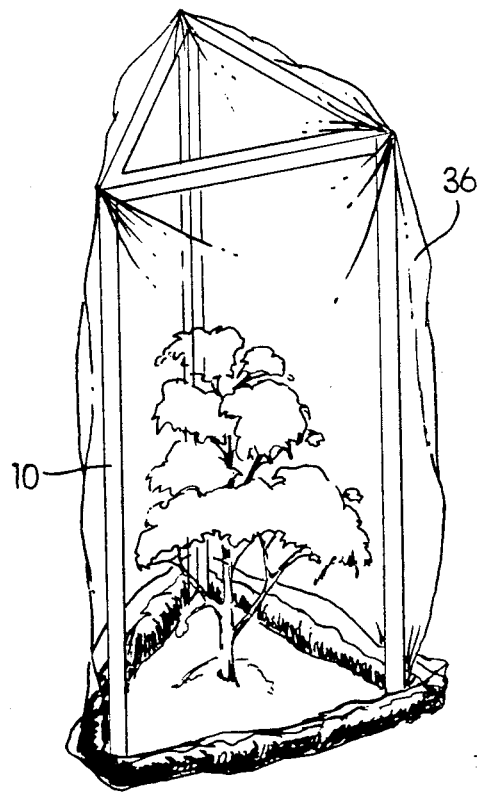
FIG. 6 is a perspective view of an alternate embodiment of the invention showing the protective covering means.

It is often desirable in many climates, particularly cooler climates wherein the normal growing season is somewhat short, to provide for early planting through the use of hot house starting. The present invention is adaptable to early plant starts through the use of the hot house principle within the field using a translucent covering means 36 such as of clear plastic as shown in FIG. 6. The covering means 36 is attached to the plant support 10 or to cooperating supports 10 for example as shown in FIGS. 2, 4 and 5. After the plants are set and/or planted, covering means 36 is lowered over the entire plant support 10 and covered with ground dirt or other suitable means known generally in the art so as to form an individual hot house type structure within the field with appropriate ventilation. After the initial growth has started and the normal growing season has arrived, the covering means 36 may be raised and lowered as desired and/or removed to allow the continued growth of the fruit or vegetable planted. This will eliminate the requirement for transplanting as is always necessary with hot house starts. In addition, the covering will provide protection for the young plants during the initial growing stages from birds, flying insects, ground animals, and potential early wind damage.

Figure 7:
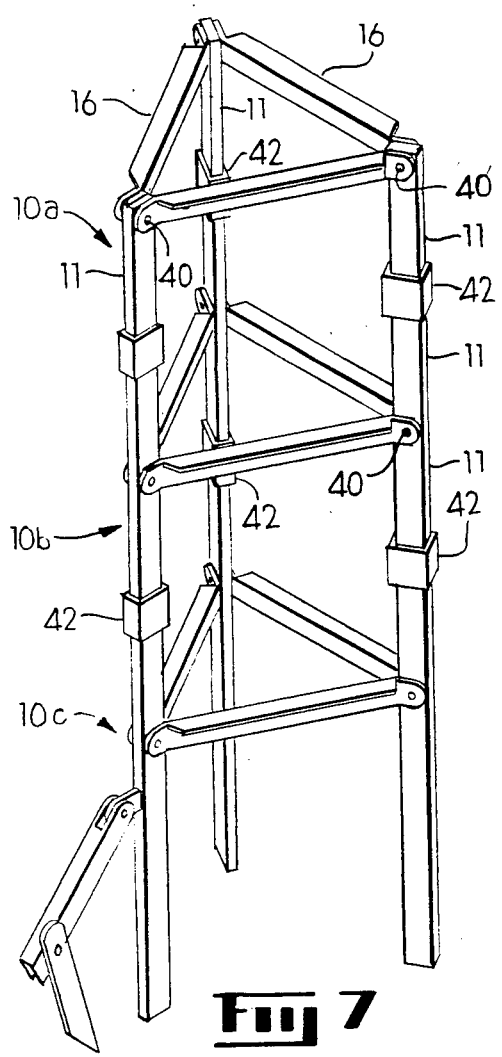
FIG. 7 is a perspective view of an alternate embodiment of the invention.
Figure 8:
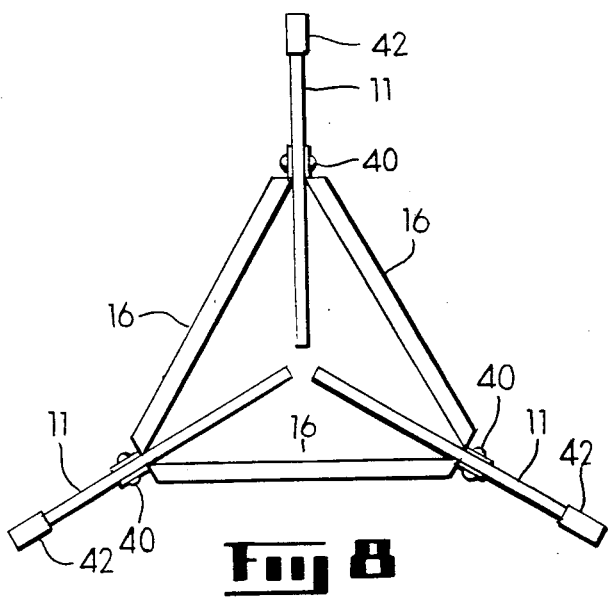
FIG. 8 is a plan view of a unit of FIG. 7 in its folded position for storage.

An alternate embodiment of the present invention is shown in FIG. 7. Such embodiment includes a plurality of individual, releasably attached support units represented by top support unit 10a, bottom support unit 10c and, optionally, one or more intermediate support units 10b depending on the height desired in the support. Each unit is readily separable from the other units at attachment or holding member 42 shown as a female receptacle adopted to receive an end of leg 11, and can be collapsed and folded for easy and efficient storage when not in use. Each unit includes a preselected numer of legs, such as three legs in FIG. 7, which are disposed about an open geometric figure defined by edge members 16 in a plane of the figure and are positioned to align in pairs of cooperating legs between units. The rotation of the legs at attachment member 40 enables rotation of the legs into the interior space and substantially into the plane for storage when separated and not in use. In addition, such attachment enables rotation of the legs at least substantially normal to the plane of assembly with a cooperating leg of an adjacent unit when the unit is assembled into the plant support assembly.

Figure 9:
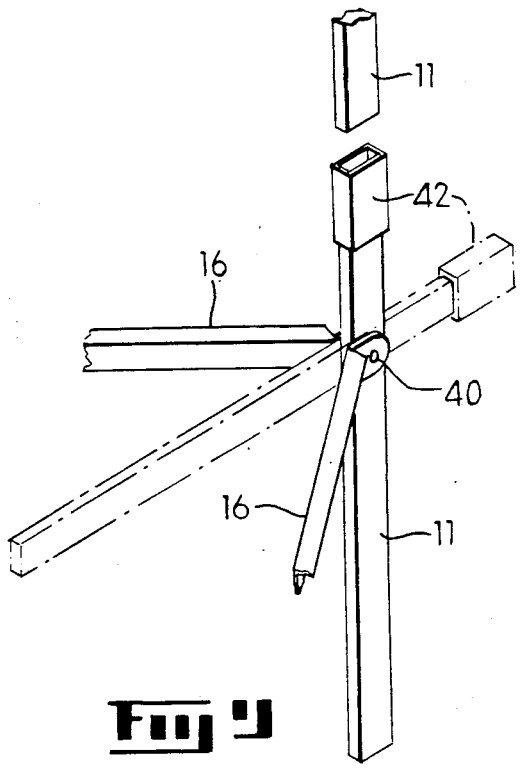
FIG. 9 is a fragmentary perspective view of a portion of the alterante embodiment of FIG. 8 showing enlarged section therein.

In the embodiment of FIG. 7, the triangular horizontal members 16, comprised of the edge members 16 as in FIG. 1, are held generally in position and the legs, shown in their vertical position, are rotatably attached such as at pins 40. Such rotation of a separated, individual support unit, in the form of an intermediate unit, is shown in phantom in the fragmentary view of FIG. 9. The collapsed intermediate unit, ready for storage, is shown in the plan view of FIG. 8. It should be understood that the embodiment of FIG. 7 can include horizontal members, defined by the edge members, of a variety of geometric shapes, for example, a circle, oval, square, rectangle, etc. Each shape includes a plurality of spaced apart legs as described above, with the units being alignable, separable and collapsable, as desired.

Figure 10:
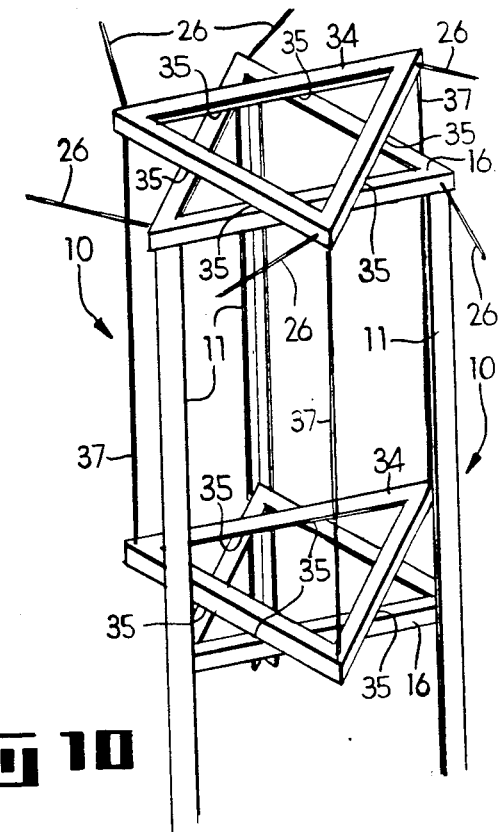
FIG. 10 is a perspective view of an alternate embodiment of the invention.

A further embodiment of the invention is shown in FIG. 10 wherein the plant support 10 as shown in FIG. 1 is utilized in conjunction with at least two triangular members 16 as shown in FIG. 1 lying in horizontal plains, one above the other, and separated by giving distance therein between and being attached thereto at the corners of the triangular members three substantially vertical leg members 11. At least two additional triangular members 34, lying in horizontal plains, one directly above the other, are added to the plant support system 10, such that the triangular members 34 are placed contiguous to the existing triangular members 16 and attached thereto by fastening means 35, such that when viewed in the plain direction, the individual contiguous structures will have the general appearance of a six-pointed star when this embodiment is used in conjunction with attachment members 26 as shown in FIGS. 2, 4, and 5. Additional support means 37 may be provided to allow for additional support within a given unit area. The option of use will be that of the individual user or agrarien, depending upon the number of plants per unit area desired to be grown or the type of plants to be grown depending upon the bearing weight of the individual weight of the individual fruit or vegetable plants. The advantage of use of this alternate embodiment allows for the production of greater numbers of fruit or vegetable plants within a minimal given area.

Because the elements of the support of the present invention are of relatively simple configuration, for example, bars, rods, wires, etc., replacement parts for the members may be made and attached with a limited amount of rework requied. For example, this will allow the user to replace broken, rotted, or otherwise damaged individual horizontal members as required with a minimum of reworking of the replacement article.

It is understood that the invention is not confined to the particular construction, materials, and arrangment of parts herein illustrated and described. Instead, it embraces all such modified forms thereof as come within the scope of the following claims.

I claim:

1. An improved collapsible plant support comprising:
   (a) a plurality of spaced apart horizontal triangular members,
   (b) a plurality of vertical members connecting said triangular members,
   (c) attachment means for attaching said vertical legs to said horizontal members, and
   (d) an anchor angle attached to one of said vertical legs
   wherein the anchor angle comprises:
   (a) a first substantially rigid member having a channeled portion along its length and a slotted portion at one end,
   (b) said first member having a hole in each of its side portions at the slotted end for acceptance of a fastening means and a hole in each of its side portions at a second end remote from the slotted end,
   (c) a second member attached thereto having a generally rectangular cross section with a pointed area at one end,
   (d) said second member having a hole to accept a fastening means for fastening to said first member at the holes at its second end for acceptance of said fastening means,
   (e) said second member attached to said first member.

2. The improved plant support of claim 1 including, in addition, a translucent covering means wherein said plant support defines a hot house type structure.

3. An improved, collapsible ground plant support comprising:
   a plurality of individual, releasably attached support units each separable and collapsable one from the others, and comprising a top support unit and a bottom support unit;
   each unit having edge members surrounding an interior space to define a geometric figure disposed substantially in a plane, and a plurality of spaced apart legs of a preselected number;
   the legs being rotatably attached to the edge members at positions which are aligned between units to provide pairs of cooperating legs, the rotatable attachment enabling rotation of the legs into the interior space and substantially into the plane of the geometric figure for storage of individual units when separated, and enabling rotation of the legs at least substantially normal to the plane for attachment to a cooperating leg when assembled as the plant support; and
   attachment means on at least one of each pair of cooperating legs to releasably attach the units together.

4. The improved plant support of claim 3 including, in addition, a translucent covering means wherein said plant support defines a hot house type structure.

5. An improved, collapsable ground plant support comprising a plurality of spaced apart generally horizontal members defined by edge members surrounding an interior space, and a plurality of spaced apart generally vertical leg members connected to the horizontal members to provide a plant support structure, wherein:
   at least one vertical member has an anchor angle attached and disposed at an angle to the member at a lower, ground contacting portion of the member, the anchor angle comprising:
   (a) an upper substantially rigid member rotatably attached at a first end to the vertical member and having a second end remote from the first end, and
   (b) a lower substantially rigid ground penetrating member having a first end rotatably attached and disposed at an angle to the second end of the upper member and having a second end adapted to penetrate the ground.

6. The plant support of claim 5 in which the anchor angle comprises:
   (a) a first substantially rigid member having a channeled portion along its length and a slotted portion at one end,
   (b) said first member having a hole in each of its side portions at the slotted end for acceptance of a fastening means and a hole in each of its side portions at a second end remote from the slotted end,
   (c) a second member attached thereto having a generally rectangular cross section with a pointed area at one end,
   (d) said second member having a hole to accept a fastening means for fastening to said first member at the holes at its second end for acceptance of said fastening means,
   (e) said second member attached to said first member.

7. An improved plant support system comprising a plurality of improved collapsbile plant supports mounted on the ground in spaced apart relationship and having attached between the supports at least one horizontal attachment member, wherein at least the first and last of said supports comprise:
   (a) a plurality of spaced apart horizontal triangular members,
   (b) a plurality of vertical members connecting said triangular members,
   (c) attachment means for attaching said vertical legs to said horizontal members, and
   (d) an anchor angle attached to one of said vertical legs wherein the anchor angle comprises:
   (a) a first substantially rigid member having a channeled portion along its length and a slotted portion at one end,
   (b) said first member having a hole in each of its side portions at the slotted end for acceptance of a fastening means and a hole in each of its side portions at a second end remote from the slotted end,
   (c) a second members attached thereto having a generally rectangular cross section with a pointed area at one end,
   (d) said second member having a hole to accept a fastening means for fastening to said first member at the holes at its second end for acceptance of said fastening means,
   (e) said second member attached to said first member.

8. The plant support of claim 7 in which at least one collapsbile intermediate support unit is disposed and separable between the top support unit and the bottom support unit.

9. The plant support of claim 7 in which the bottom support unit has attached to a leg or anchor angle comprising:
   (a) a first substantially rigid member having a channeled portion along its length and slotted portion at one end,
   (b) said first member having a hole in each of its side portions at the slotted end for acceptance of a fastening means and a hole in each of its side portions at a second end remote from the slotted end,
   (c) a second member attached thereto having a generally rectangular cross section with a pointed area at one end,
   (d) said second member having a hole to accept a fastening means for fastening to said first member at the holes at its second end for acceptance of said fastening means,
   (e) said second member attached to said first member.

* * * * *